United States Patent [19]

Krawczak et al.

[11] 4,328,468

[45] May 4, 1982

[54] MULTIPASS LASER OPTICS FOR LIGHT DEFLECTOR

[75] Inventors: John A. Krawczak, Hopkins; Ernest J. Torok, Minneapolis, both of Minn.

[73] Assignee: Sperry Corporation, New York, N.Y.

[21] Appl. No.: 112,509

[22] Filed: Jan. 16, 1980

[51] Int. Cl.$^3$ .............................................. H01S 3/082
[52] U.S. Cl. ........................................ 372/97; 372/102
[58] Field of Search ................... 331/94.5 C, 94.5 M; 350/358

[56] References Cited

U.S. PATENT DOCUMENTS 3,611,181 10/1971 Lary et al. ...................... 331/94.5 C Primary Examiner—William L. Sikes
Attorney, Agent, or Firm—Kenneth T. Grace; Thomas J. Scott; Marshall M. Truex

[57] ABSTRACT

An apparatus for and a method of providing an amplified, directable laser light beam is disclosed. The apparatus includes two optical cavities sharing a common mirror. The first cavity is resonant and contains a laser rod intermediate a high reflectivity reflecting mirror of 100% reflectivity and a low reflectivity transmitting mirror of 10-90% reflectivity. The second cavity is antiresonant and contains a Faraday effect diffraction grating intermediate the low reflectivity mirror and a 100% reflectivity mirror. The laser light beam that passes through the transmitting mirror is directed normally incident to the surface of and passes through the Faraday effect diffraction grating. On the far side of the diffraction grating is a mirror of 100% reflectivity, which reflects the laser light beam back through the diffraction grating forming a pair of diffracted congruent 1'st order light beams and a single undiffracted 0'th order light beam. The 0'th order light beam is directed back through the transmitting mirror, through the laser rod to be reflected between its reflecting and transmitting mirrors and to again pass through the transmitting mirror onto the diffraction grating to provide 1'st order light beams of increased intensity.

17 Claims, 8 Drawing Figures

THE LEFT HAND SIDE OF FIG. 2 WITH ILLUMINATION $A_b$ FROM THE RIGHT HAND SIDE.

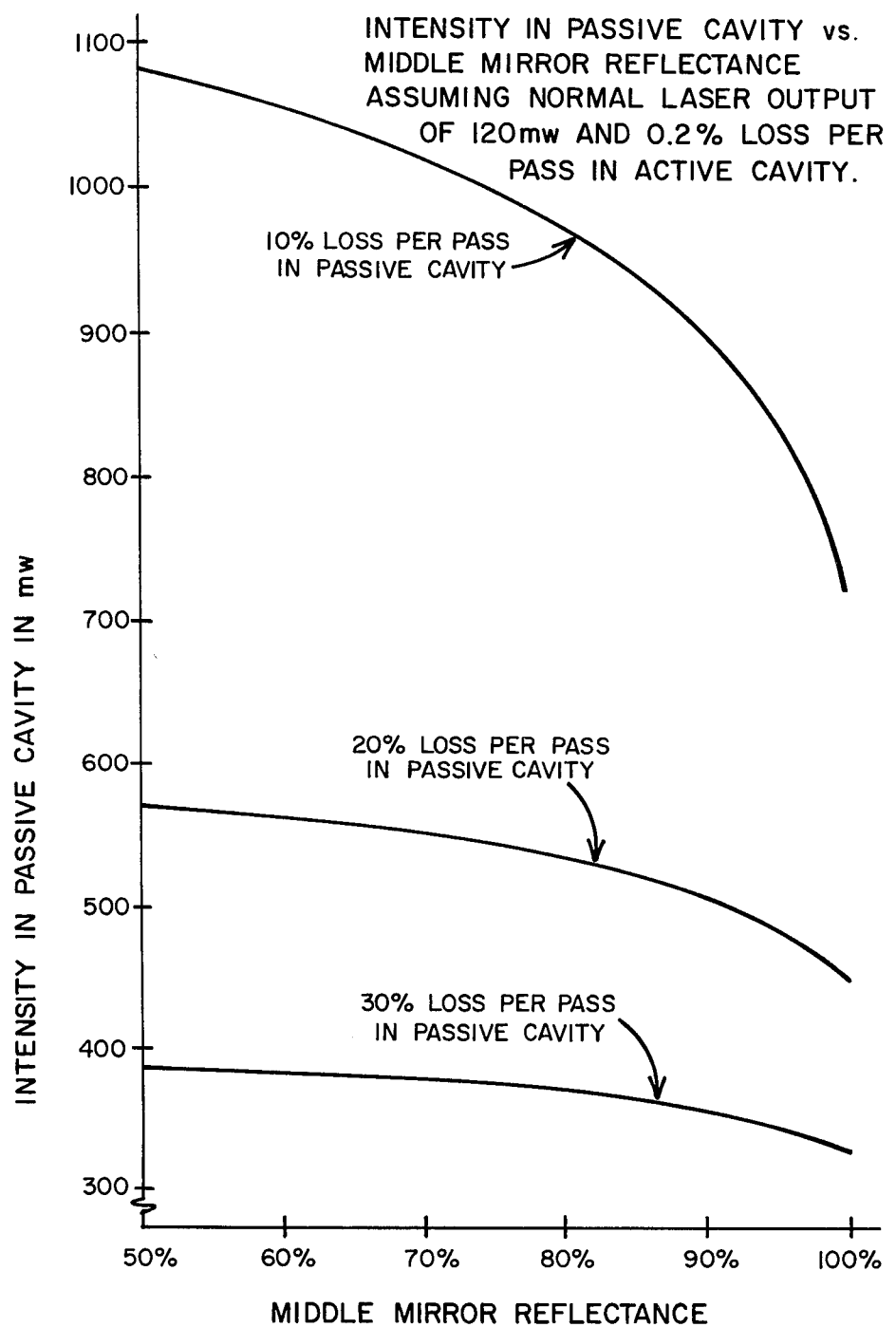

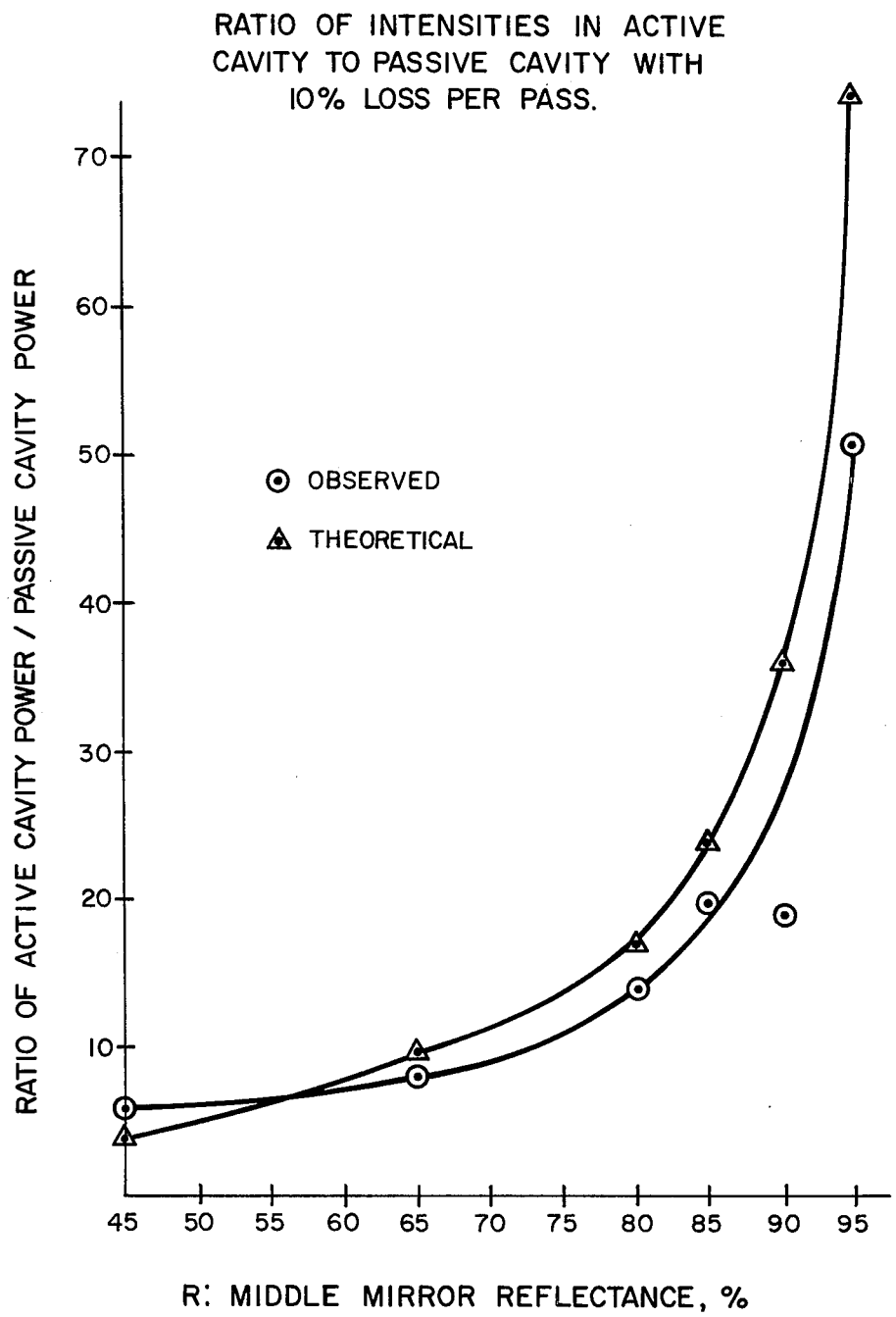

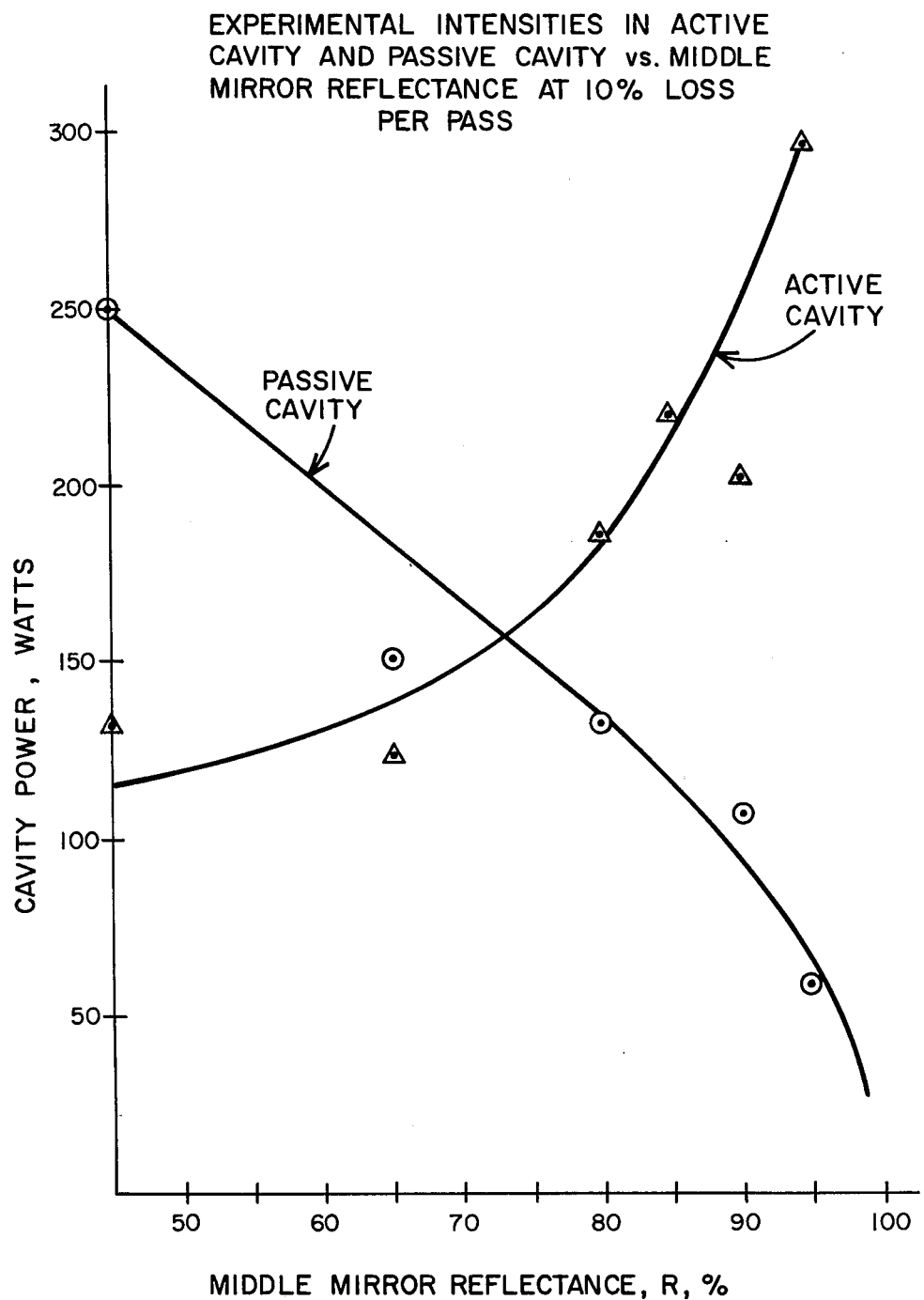

MULTIPASS LASER OPTICS FOR LIGHT DEFLECTOR

BACKGROUND OF THE INVENTION

In the E. J. Torok, et al, U.S. Pat. No. 3,752,563 there is disclosed a magneto-optic light deflection system that utilizes the stripe domains in a magnetic film as a diffraction grating. The angle of deflection of the light from the plane of the film is varied in two dimensions by varying the separation and orientation of the stripe domains. By coating the far surface of the stripe domain Faraday effect film with a high reflectivity mirror, the light passing through each stripe is reflected by the high reflectivity mirror and is passed back out the film thereby gaining twice the Faraday rotation. However, the diffraction grating efficiency, that is, the ability of the Faraday effect film to deflect a significant proportion of the laser light beam into the 1'st order light beams, is extremely small, e.g., about 0.2% for a 24 micron ($\mu$m) thick liquid phase epitaxial garnet film deflecting 1.06 $\mu$m light, because of the difficulty of making liquid phase epitaxial garnet films of sufficient thickness to deflect a significant portion of the laser light beam. Accordingly, because of their low efficiency, such single pass magneto-optic light deflection systems have not been able to provide the necessary deflected light intensities that are required for practical applications.

SUMMARY OF THE INVENTION

In the present invention, a standard laser light beam source is modified by replacing its relatively high, e.g., 95–98%, reflectivity transmitting mirror by a relatively low, e.g., 10–90%, reflectivity i.e., partially reflecting mirror. An external antiresonant or passive cavity is formed using a high, e.g., 100%, reflectance mirror and the said low reflectance mirror. (An antiresonant cavity has a length of $(n\lambda/2)+(\lambda/4)$ where $\lambda$ is the light wavelength and n is any positive integer. A resonant or active cavity has a length of $m\lambda/2$) where m is any positive integer.) A Faraday effect diffraction grating is placed in this antiresonant or passive cavity. The 100% reflectivity mirror reflects the laser light beam back through the diffraction grating forming a single 0'th order light beam and a pair of congruent 1'st order light beams. The 0'th order light beam is reflected back through the partially reflecting mirror, through the laser rod and onto the relatively high, e.g., 100%, reflectivity reflecting mirror on the far end of the laser rod. Thus, the antiresonant cavity containing the deflector crystal and the resonant cavity containing the laser rod form a coupled system from which the only transmitted light is that of the two 1'st order light beams.

BRIEF DESCRIPTION OF THE DRAWINGS

FIG. 6 is a plot of the light intensity in the passive cavity as a function of the reflectance of the middle mirror of FIG. 2.

FIG. 7 is a plot of the ratio of light intensities in the active cavity to that of the passive cavity with a 10% loss per pass.

FIG. 8 is a plot of the experimental light intensities in the active cavity and the passive cavity as a function of the reflectance of the middle mirror with a 10% loss per pass.

DESCRIPTION OF THE PREFERRED EMBODIMENT

Figure 1:
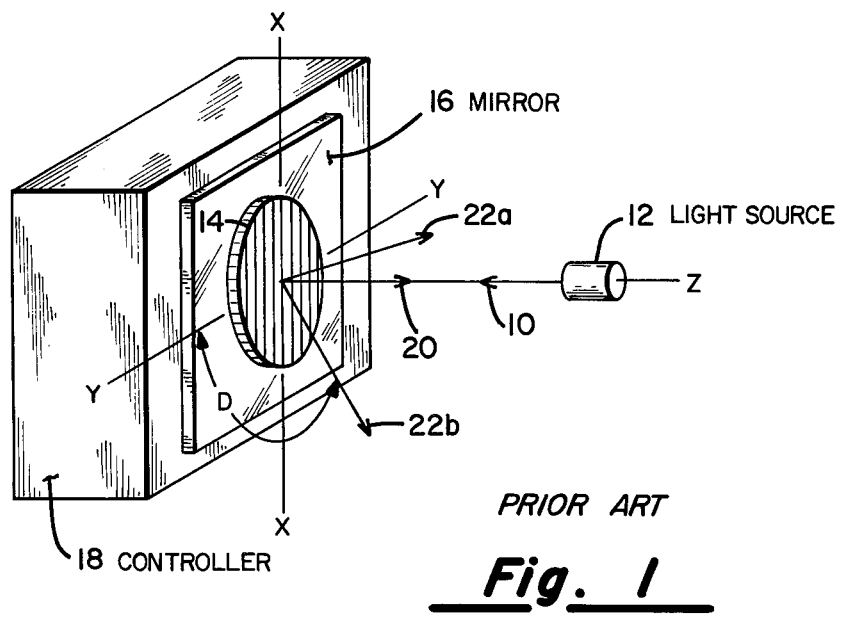
FIG. 1 is a diagrammatic illustration of a prior art light deflector in a single-pass operation configuration.

With particular reference to FIG. 1, there is presented a schematic illustration of a prior art magneto-optic light deflection system as taught by the E. J. Torok, et al, U.S. Pat. No. 3,752,563. In this embodiment, the light beam 10 from the resonant cavity, or light source, 12 impinges normally upon and passes through the Faraday effect diffraction grating 14 and then upon the reflecting mirror 16 of 100% reflectivity. The reflecting mirror 16 reflects the light beam 10 back through the diffraction grating 14 which, under control of controller 18, forms the single 0'th order light beam 20 and the two congruent 1'st order light beams 22a, 22b. In this prior art embodiment, substantially no portion of the 0'th order light beam 20 is transmitted back into the resonant cavity 12.

Figure 2:
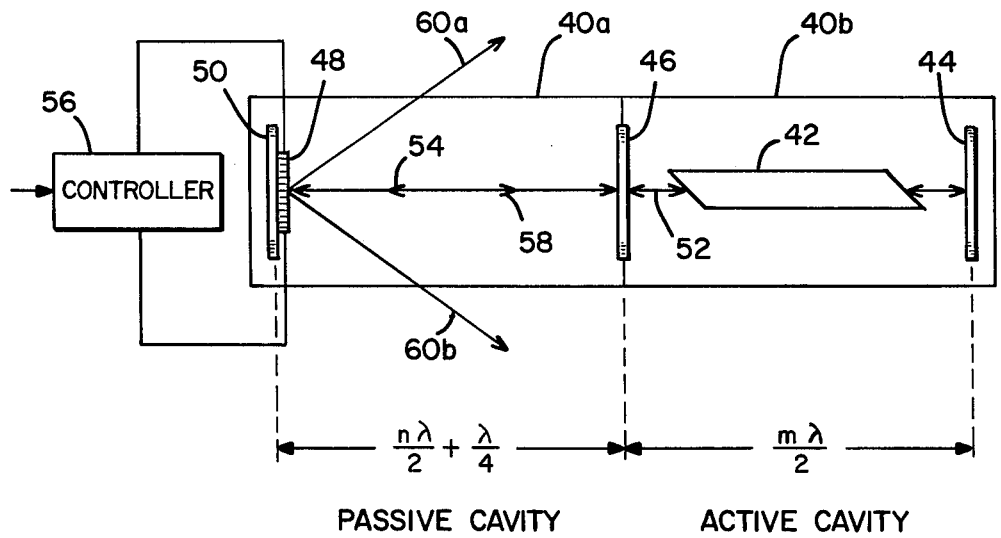
FIG. 2 is a diagrammatic illustration of a light deflector in a three-mirror multipass operation configuration of the present invention.

With particular reference to FIG. 2, there is presented a schematic illustration of a preferred embodiment of a magneto-optic light deflector system incorporating the present invention. In the embodiment of FIG. 2, the resonant or active cavity 40b includes a reflecting mirror 44 of substantially 100% reflectivity and a partially reflecting mirror 46 of 10–90% reflectivity. (A resonant cavity is an integral number of half wavelengths long.) The antiresonant or passive cavity 40a, which is an integral number of half wavelengths long plus a quarter wavelength long, includes the partially reflecting mirror 46, a Faraday effect diffraction grating 48 and a reflecting mirror 50 of substantially 100% reflectivity that is formed on the far side of diffraction grating 48. The laser rod generated laser light beam 52 oscillates between the reflecting mirror 44 and the partially reflecting mirror 46 with a relatively large portion 54 of the beam 52 transmitted through partially reflecting mirror 46. The transmitted light beam 54 impinges normally upon and passes through the Faraday effect diffraction grating 48 and then upon the reflecting mirror 50 of 100% reflectivity. The reflecting mirror 50 reflects the light beam 54 back through the diffraction grating 48 which, under control of controller 56, forms the single 0'th order light beam 58 and the two congruent 1'st order light beams 60a, 60b. In this embodiment, a substantial portion of the 0'th order light beam 58 is transmitted back through partially reflecting transmitting mirror 46 and thence through the laser rod 42 and upon the reflecting mirror 44. The reflecting mirror 44 reflects the 0'th order light beam 58 back through the laser rod 42 and upon the partially reflecting mirror 46 from whence a substantial proportion is transmitted therethrough to again impinge upon the diffraction grating 48 and the reflecting mirror 50. Accordingly, it can be seen that the reflecting mirror 44, laser rod 42, partially reflecting mirror 46, diffraction grating 48 and reflecting mirror 50 are all oriented for directing the light beams 52, 54 and 58 along a common optical axis, e.g., the z axis of FIG. 1. Thus, in this embodiment, the 0'th order light beam is not wasted but is recycled in the cavities 40a and 40b to build up the intensity in the cavities and thus provide a pair of 1'st order light beams of substantially amplified intensity.

DETAILED DESCRIPTION

A detailed description of the operation of the single-pass magneto-optic stripe domain light deflector system of FIG. 1 is given in the hereinabove referenced E. J. Torok, et al, U.S. Pat. No. 3,752,563. The light deflector is a magneto-optic crystal film of, e.g., garnet, in which stripe domains form a Faraday effect phase diffraction grating. The orientation and the spacing of the stripe domains are alterable by an externally applied magnetic field which deflects an incident light beam into wide angles in two dimensions.

The transmission efficiency of the stripe domain magneto-optic light deflector film is limited by the absorption of the garnet crystal and by the difficulty of making liquid phase epitaxial garnet crystal films that are thick enough to deflect a large portion of the incident light beam. A single-pass garnet crystal film should be nearly 600 μm thick for maximum single-pass efficiency at 1.06 μm wavelength; however, crystal films even 1/10 that thickness have proved very difficult to grow. The multipass approach of the present invention enables one to use thin crystal films, easily grown, instead of the thick crystal films that are most suitable for single-pass operation. Moreover, the efficiency of multipass operation can be shown to be greater than that of even the optimum thickness single-pass crystal film.

FIG. 1 illustrates a light deflector in a single-pass operation configuration. The light beam 10 passes twice through the crystal film forming the diffraction grating 14. Unless the crystal film is thick enough to rotate the polarization of the light beam that passes through a single stripe exactly 90° via the Faraday effect, there will be a 0'th order light beam produced. The crystal films that are commonly used in this configuration are only thick enough to rotate a 1.06 μm wavelength light beam 0.1°, i.e., the 1'st order light beams. Thus, the largest portion of the light beam emerges from the diffraction grating 14 as the 0'th order light beam and is wasted.

FIG. 2 illustrates a light deflector in a three-mirror multipass operation configuration. The middle, partially reflecting mirror 46 is not the ordinary output or transmitting mirror of the laser, but rather a mirror of substantially lower reflectivity, i.e., 10-90% reflectivity. A 100% reflectivity mirror 50 has been placed behind the diffraction grating 48 formed by a garnet crystal film. This reflecting mirror 50 is oriented so that it reflects the undeflected, 0'th order, laser light beam right back onto the partially reflecting mirror 46 and thence upon the laser rod 42. Thus, the undeflected 0'th order light beam, which otherwise would be wasted, is recycled and eventually deflected in the 1'st order light beams. That is, the only light that emerges from the system of FIG. 2 is that light that is deflected by the stripe domain crystal film as the two 1'st order light beams. This crystal film is coated with anti-reflection layers so that any light impinging upon the crystal film must pass through, be reflected by the 100% mirror 50 and pass through again.

The magnitude of the reflectivity of the middle, or partially reflecting mirror 46 is of essential importance. If middle mirror 46 were removed altogether from the system, the laser would not lase unless the absorption and deflection efficiency of the crystal film is very small. When the loss per pass through the crystal film 48 exceeds the gain per pass through the laser rod 42, the laser is extinguished. Most crystal films tested in the Sperry Univac laboratory are in this category, although other crystal films almost, but not quite, extinguish the laser. When the loss per pass through the crystal film 48 is nearly as large as the gain per pass through the laser rod 42, a large number of passes must be made to build up the intensity inside the resonant cavity 40b. In that case, the losses due to beam spreading predominate and the intensity of the light beam remains small. On the other hand, if the middle mirror 46 is too reflective, the intensity of the light beam in the laser rod 42 will be too high and the loss due to leakage around the mirrors 44 and 46 at the edges of the rod 42 will be larger than the light removed by the deflector crystal film 48. The optimum value of reflectance of the middle mirror 46 is somewhat less than that of the ordinary output mirror 16 of 90-100% reflectivity and is optimally in the range 40-80% but may be as low as 10% or as high as 90%.

In one embodiment of the apparatus of FIG. 2, the laser wavelength was 1.06 μm and the value of the middle mirror 46 was 90% reflectance. The deflector crystal film 48 was bismuth substituted lutetium iron garnet and ordinarily, as in the embodiment of FIG. 1, deflects 0.1% on a single-pass. The value of the 1.06 μm light beam intensity in the laser rod 42 when the mirror 50 next to the deflector crystal film was misaligned was 0.78 watts. However, this value of 0.78 watts rose to 72.0 watts when the mirror 50 was aligned. The amplitude of the deflected light beam, i.e., the 1'st order light beam, rose by a factor of 100 when the middle mirror 46 was aligned to recycle the 0'th order light beam. The deflection efficiency of the deflector crystal film in FIG. 2 rose to 10% from a single-pass value of 0.1% in FIG. 1.

THEORY OF A THREE MIRROR CAVITY

The three mirror cavity shown in FIG. 2 consists of two coupled cavities. The cavity 40b, which contains the laser rod 42 is a resonant cavity, i.e., the spacing between the middle mirror 46 and the 100% reflecting mirror 44 is an integral number of half wavelengths $m\lambda/2$, where m is a positive integer. The cavity 40a containing the stripe domain crystal film 48 is antiresonant, i.e., the spacing between the 100% mirror 50 behind the stripe crystal film 48 and the middle mirror 46 contains an odd number of quarter wavelengths $(n\lambda/2)+(\lambda/4)$, where n is a positive integer. Thus the intensity in the cavity 40a is much lower than in the cavity 40b. If both cavities 40a and 40b were resonant this would not be the case; the system would oscillate between having most of the light in one cavity and having most of the light in the other. The loss through the stripe crystal film 48 would extinguish any wavelength for which this is true. Thus, the case in which the cavity 40a is antiresonant is the correct situation.

Figure 3:
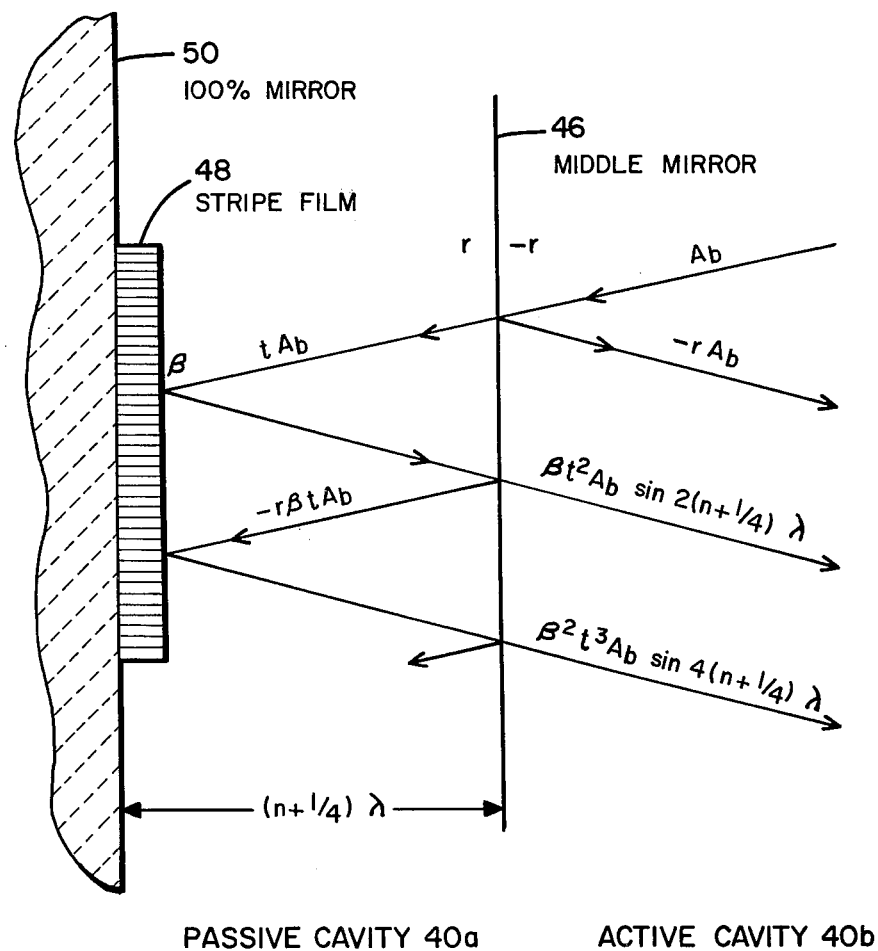
FIG. 3 is a diagrammatic illustration of the path of a light beam impinging upon the middle mirror of FIG. 2.

FIG. 3 shows the path of a light beam impinging on the middle mirror 46 of the cavity 40b. We call the amplitude of light in the active cavity 40b (the one containing the laser rod 42) $A_b$ and the amplitude of light in the passive cavity 40a (the one containing the deflector film 48) $A_a$. Light passing through the deflector film 48 is attenuated, so the ratio of light emerging from the deflector film 48 to that entering we call $\beta$. The fraction of light intensity lost per pass is $1-\beta^2$. Let t and r be the amplitude transmission and reflection coefficients of the middle mirror. Let T and R be the intensity transmission and reflection coefficients. $R=r^2$, $T=t^2$, and $1=r^2+t^2$. Light reflected from the righthand side of the dielectric middle mirror 46 undergoes a 180° phase shift, while that reflected from the left does not. This arises from the fact that light reflected from an interface between two regions udergoes a 180° phase change when striking the boundary from the side of higher velocity but not from the side of lower velocity. A dielectric mirror has many layers one quarter wavelength thick. If we define the mirror surface to be one particular interface, then light reflected from the righthand side into the cavity 40b changes phase while light reflected from the left into the cavity 40a does not.

The ratio of amplitude of light in the antiresonant cavity 40b to light impinging on it from the right of FIG. 3 is:

$$\frac{A_a}{A_b} = t(1 - \beta r + \beta^2 r^2 - \beta^3 r^3 + \beta^4 r^4 + ...) \quad (1)$$

$$\frac{A_a}{A_b} = \frac{t}{1 + \beta r}$$

From the viewpoint of an observer to the right of FIG. 3, the passive cavity 40a of FIG. 2 might appear as a mirror; i.e., light of amplitude $A_b$ striking the middle mirror 46 from the right will return with an amplitude $A'_b$. The apparent amplitude reflectivity we call r' and is given by:

$$r' \equiv \frac{A_b'}{A_b} = r - t^2\beta + t^2\beta^2 r - t^2\beta^3 r^2 + ... \quad (2)$$

$$r' = \frac{A_b'}{A_b} = \frac{-r + \beta}{1 + \beta r}$$

Figure 4:
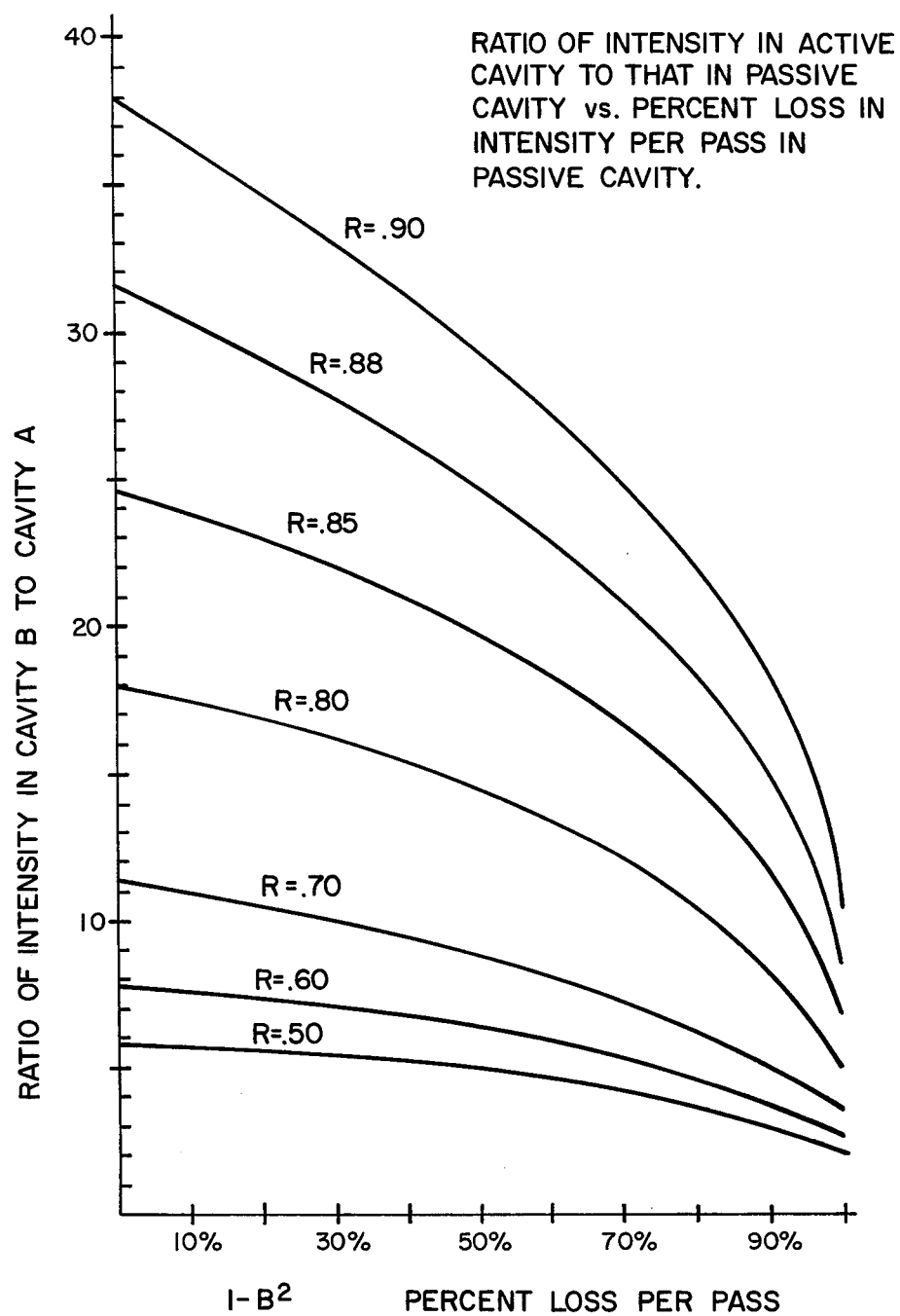
FIG. 4 is a plot of the ratio of the light intensities in the active and passive cavities of FIG. 2.

Equation 1 gives the ratio of amplitude of light inside the passive antiresonant cavity 40a to the amplitude of light in the active resonant cavity 40b. This ratio depends only on the reflectivity of the middle mirror 46 and on the absorption per pass in the passive cavity 40a. Gain or loss in the active cavity 40b does not enter at all. The ratio of intensities of light in the two cavities is plotted in FIG. 4 as a function of the percentage loss per pass in the passive cavity 40a. This is a family of curves corresponding to different values of middle mirror 46 reflectance: R.

It should be pointed out that the loss per pass in the passive cavity 40a need not be entirely due to absorption in or deflection from the deflector film 48. Nonuniformity in reflecting surface can make the beam expand or "walk" off the correct path and miss an aperture.

Figure 5:
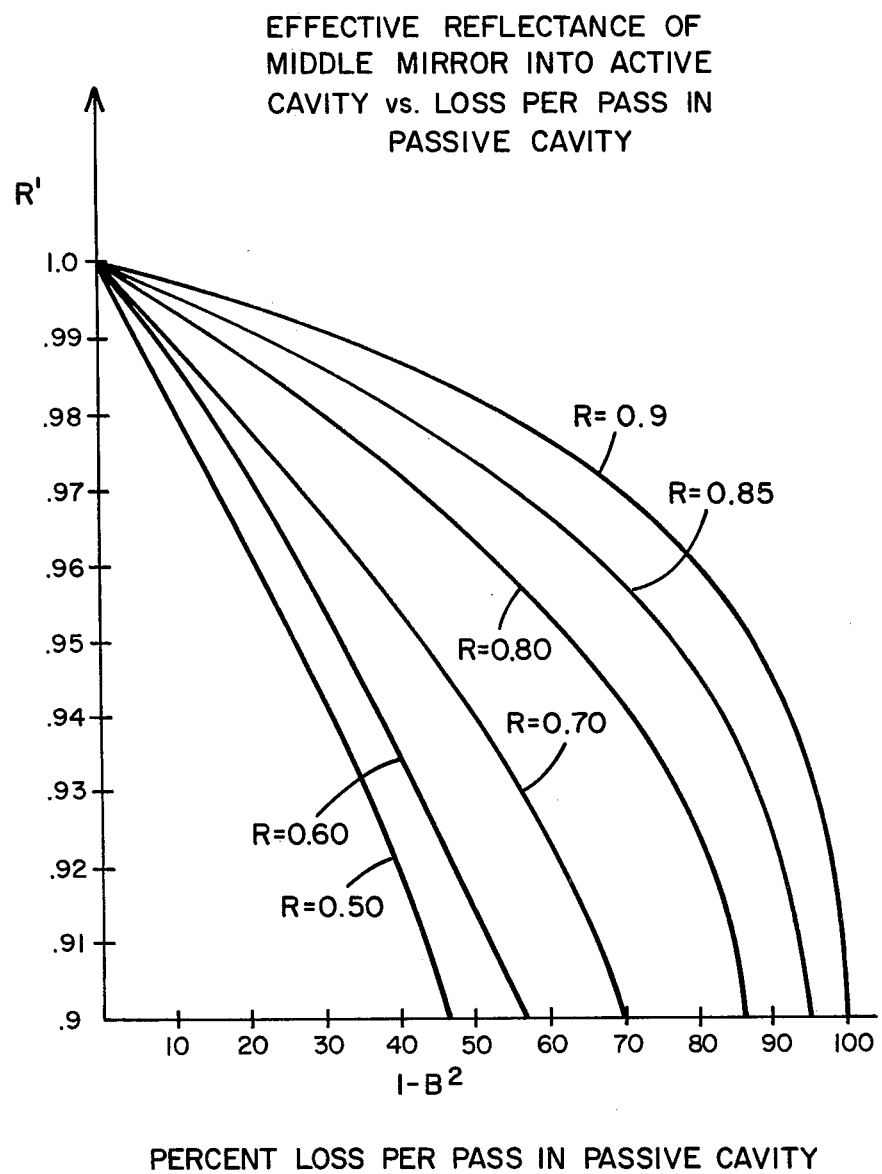
FIG. 5 is a plot of the intensity reflectance R' of the configuration of FIG. 3.

Equation 2 gives the apparent reflectance of the two mirror system of FIG. 3. This two mirror system replaces the output mirror of the laser. The intensity reflectance, $R'=r'^2$ is plotted in FIG. 5. The reflectance of the system is always greater than the reflectance of the middle mirror by itself. Since the output mirror of the laser is chosen to yield the highest output, one would guess that one should choose a value middle mirror that would cause the effective reflectance R' of the two mirror system to be the same as the normal output mirror it replaces.

FIG. 6 shows the intensity in the passive cavity 40a as a function of middle mirror 46 reflectance. The light deflector system output is proportional to the intensity of the light incident on the deflector film 48, so the ordinate of FIG. 6 is proportional to the light deflector system output. The output increases with decrease in middle mirror reflectance. The curves were made assuming a constant input of 120 milliwatts (mw) being injected into the active cavity via the laser rod. Not shown is the fall-off in intensity that occurs when the reflectance R' of the two mirrors replacing the output mirror falls below the threshold necessary to sustain gain in the rod. This occurs some place off the paper. FIG. 6 indicates that higher deflection efficiency occurs when the middle mirror has a substantially lower reflectivity than the normal output mirror of the laser.

EXPERIMENTAL RESULTS

In order to test the foregoing theory, several experiments were performed. FIG. 7 shows the experimental and theoretical curves of the ratio of intensity in the active cavity to that in the passive cavity, as a function of middle mirror reflectance for the case of 10% loss per pass in the passive cavity. The value of 10% loss per pass was ensured by replacing the crystal deflector film and the 100% mirror by a 90% mirror. There is good agreement between theory and experiment. FIG. 8 shows the actual intensities in both cavities as a function of middle mirror reflectance. The power in the passive cavity is substantially larger for lower reflectivity middle mirrors, indicating that higher deflection efficiency occurs when the middle mirror has a substantially lower reflectivity than the normal output mirror of the laser.

What is claimed:

1. A multipass optic system, comprising:
   a resonant cavity comprising;
      a first reflecting mirror of substantially 100% reflectivity, and
      a partially reflecting mirror;
   an antiresonant cavity comprising;
      said partially reflecting mirror,
      a Faraday effect diffraction grating, and
      a second reflecting mirror of substantially 100% reflectivity on the far side of said diffraction grating;
   a light beam source oriented within said resonant cavity;
   said partially reflecting mirror oriented for optically coupling said light beam from said resonant cavity to said antiresonant cavity;
   means coupled to said diffraction grating for varying the diffraction characteristics of said diffraction grating for generating from said light beam a single 0'th order light beam and two congruent 1'st order light beams and
   said partially reflecting mirror oriented for optically coupling said 0'th order light beam between said antiresonant cavity and said resonant cavity.

2. The multipass optic system of claim 1 in which said second reflecting mirror is formed upon and integral with the far side of said diffraction grating.

3. The multipass optic system of claim 1 in which said partially reflecting mirror has a reflectivity in the range between 40-80%.

4. The multipass optic system of claim 1 in which said partially reflecting mirror has a reflectivity in the range between 10-90%.

5. A multipass optic system, comprising:
   a first reflecting mirror of substantially 100% reflectivity;

a partially reflecting mirror of reflectivity in the range between 40% and 80%;
a Faraday effect diffraction grating;
a second reflecting mirror of substantially 100% reflectivity on the far side of said diffraction grating;
said first reflecting mirror and said partially reflecting mirror forming a resonant cavity;
said second reflecting mirror, said diffraction grating and said partially reflecting mirror forming an antiresonant cavity;
a light beam source oriented within said resonant cavity;
said partially reflecting mirror oriented for optically coupling said light beam from said resonant cavity to said antiresonant cavity;
means coupling to said diffraction grating for varying the diffraction characteristics of said diffraction grating for generating from said laser light beam a 0'th order light beam and a 1'st order light beam; and
said diffraction grating directing said 0'th order light beam back through said partially reflecting mirror to be passed through said laser rod source onto said first reflecting mirror and thence back through said laser rod source and said partially reflecting mirror and back onto said diffraction grating and said second reflecting mirror for generating said 1'st order light beam of an amplified intensity.

6. The multipass optic system of claim 5 in which said second reflecting mirror is formed upon and integral with the far side of said diffraction grating.

7. A multipass optic system, comprising:
a first reflecting mirror;
a partially reflecting mirror;
a Faraday effect diffraction grating;
a second reflecting mirror;
said first reflecting mirror and said partially reflecting mirror forming a resonant cavity;
a light beam source included within said resonant cavity;
said second reflecting mirror, said diffraction grating and said partially reflecting mirror forming an antiresonant cavity;
said resonant cavity and said antiresonant cavity oriented along an optical axis;
means coupled to said diffraction grating for varying the diffraction characteristics of said diffraction grating for generating from said laser light beam a single 0'th order light beam, which is directed along said optical axis, and two congruent 1'st order light beams;
said diffraction grating directing said 0'th order light beam back through said partially reflecting mirror to be passed through said laser rod source onto said first reflecting mirror and thence back through said laser rod source and said first partially reflecting mirror and back onto said diffraction grating and said second reflecting mirror, all along said optical axis, for generating said 1'st order light beams of an amplified intensity.

8. The multipass optic system of claim 7 in which said second reflecting mirror is formed upon and integral with the far side of said diffraction grating.

9. The multipass optic system of claim 7 in which said transmitting mirror has a reflectivity in the range between 40–80%.

10. The multipass optic system of claim 7 in which said transmitting mirror has a reflectivity in the range between 10–90%.

11. A multipass optic system, comprising
a resonant cavity;
a light beam source included within said resonant cavity;
an antiresonant cavity optically coupled to said resonant cavity and including means for generating from said light beam a 0'th order light beam and a 1'st order light beam;
said antiresonant cavity directing said 0'th order light beam back to said resonant cavity which in turn redirects said directed 0'th order light beam back to said antiresonant cavity for generating said 1'st order light beam of an amplified intensity.

12. The multipass optic system of claim 11 in which said resonant cavity and said antiresonant cavity are optically coupled by a partially reflecting mirror.

13. The multipass optic system of claim 12 in which said partially reflecting mirror has a reflectivity in the range between 40–80%.

14. The multipass optic system of claim 12 in which said partially reflecting mirror has a reflectivity in the range between 10–90%.

15. The multipass optic system of claim 12 in which said antiresonant cavity includes a Faraday effect diffraction grating and a reflecting mirror formed integral therewith and on the far side thereof for reflecting said light beam back through said diffraction grating and for generating said 0'th order and 1'st order light beams.

16. The multipass optic system of claim 1 in which said light beam is a coherent light beam of a wavelength in the visible spectrum.

17. The multipass optic system of claim 16 in which said light beam source and said resonant cavity form a laser.

* * * * *

UNITED STATES PATENT AND TRADEMARK OFFICE
CERTIFICATE OF CORRECTION

PATENT NO. : 4,328,468
DATED : May 4, 1982
INVENTOR(S) : John A. Krawczak and Ernest J. Torok It is certified that error appears in the above-identified patent and that said Letters Patent are hereby corrected as shown below:

Column 7, Line 17, "coupling" should be — coupled — .

Column 8, Line 19, "comprising" should be — comprising: — .

Line 47, "claim 1" should be — claim 11 — .

Signed and Sealed this

Seventh Day of December 1982

[SEAL]

Attest:

GERALD J. MOSSINGHOFF

Attesting Officer  Commissioner of Patents and Trademarks